United States Patent
Dana et al.

(10) Patent No.: US 7,441,514 B2
(45) Date of Patent: Oct. 28, 2008

(54) PET DISH AND DISPOSABLE LINER

(76) Inventors: Gail Dana, 4572 Norma Dr., San Diego, CA (US) 92115; William Behun, 4572 Norma Dr., San Diego, CA (US) 92115

( * ) Notice: Subject to any disclaimer, the term of this patent is extended or adjusted under 35 U.S.C. 154(b) by 134 days.

(21) Appl. No.: 11/711,360

(22) Filed: Feb. 27, 2007

(65) Prior Publication Data

US 2007/0144447 A1 Jun. 28, 2007

Related U.S. Application Data

(63) Continuation-in-part of application No. 11/150,704, filed on Jun. 10, 2005, now Pat. No. 7,204,202.

(51) Int. Cl.
*A01K 5/01* (2006.01)
*B65D 21/02* (2006.01)

(52) U.S. Cl. ............... 119/61.5; 220/574.3; 220/23.87

(58) Field of Classification Search ............ 119/61.5, 119/61.53, 61.54, 61.55; D30/129, 130; 220/4.26, 23.87, 23.88, 23.89, 495.01, 495.03, 220/574.3
See application file for complete search history.

(56) References Cited

U.S. PATENT DOCUMENTS

| | | | |
|---|---|---|---|
| 730,082 A | 6/1903 | Bates | |
| 1,583,512 A * | 5/1926 | Worth | 220/574.3 |
| 3,076,579 A * | 2/1963 | Kuhlman | 220/574.3 |
| 3,080,997 A * | 3/1963 | Brown | 220/606 |
| 3,347,411 A * | 10/1967 | Kalata et al. | 206/519 |
| 3,413,820 A * | 12/1968 | Paquin | 62/371 |
| 3,527,192 A * | 9/1970 | Ferrara | 119/61.5 |
| 3,653,362 A | 4/1972 | Davis | 119/61 |
| 3,672,538 A * | 6/1972 | Wiedemann | 206/519 |
| 3,698,594 A | 10/1972 | Boehlert | 220/63 |
| 3,749,276 A * | 7/1973 | Davis | 220/789 |
| 3,991,719 A * | 11/1976 | Bruce | 119/61.5 |
| 4,182,462 A * | 1/1980 | Buff, Jr. | 220/495.03 |
| 4,224,876 A * | 9/1980 | Larsen | 105/199.4 |
| 4,428,325 A | 1/1984 | Koch | 119/61 |
| 4,735,340 A * | 4/1988 | Preston | 220/495.1 |
| 4,800,845 A | 1/1989 | Budd | 119/61 |
| 4,925,056 A * | 5/1990 | McCoig | 220/495.1 |
| D330,785 S | 11/1992 | Jordan | D30/129 |
| D358,008 S * | 5/1995 | Keller et al. | D30/161 |
| 5,445,110 A | 8/1995 | Birnie | 119/61 |
| 5,645,186 A * | 7/1997 | Powers et al. | 220/495.11 |
| 5,735,495 A * | 4/1998 | Kubota | 248/100 |
| 5,782,374 A * | 7/1998 | Walker | 220/23.87 |
| 6,644,241 B2 | 11/2003 | Brown | 119/61.5 |
| 7,392,761 B2 * | 7/2008 | Kujawa et al. | 119/61.5 |

* cited by examiner

*Primary Examiner*—Yvonne R. Abbott
(74) *Attorney, Agent, or Firm*—Steins & Associates, P.C.

(57) ABSTRACT

The device is a Pet Dish for holding Disposable Liners. The dish is durable and washable, but the liner can be disposable, in a form that is conventionally available from a number of pre-existing supply sources. The dish is aesthetically pleasing. The dish and liners cooperate so that the liner inserted into the dish will not inadvertently be forced out by the eating pet, nor should the liner be allowed to spin within the dish. The dish and liners are also configured so that a stack of liners can be held conveniently within a single dish. The dish may resemble the face of a pet, such as a cat or dog.

20 Claims, 8 Drawing Sheets

PET DISH AND DISPOSABLE LINER

This application is a continuation-in-part of application Ser. No. 11/150,704, filed Jun. 10, 2005, now U.S. Pat. No. 7,204,202 now pending.

BACKGROUND OF THE INVENTION

1. Field of the Invention

This invention relates generally to pet products and, more specifically, to a Pet Dish and Disposable Liner.

2. Description of Related Art

Pet food and water dishes are available in virtually all shapes and sizes, and typically present a common problem for the pet caretakers—they become soiled and are very undesirable to clean once in that condition.

Several inventions have sought to solve this problem using a variety of techniques. Birnie, U.S. Pat. No. 5,445,110 discloses a "Pet Feeding System with Disposable Inserts." The Birnie device is a semi-spherical bowl having a stack of disposable bowl liners within it. The liners each have an adhesive tab to hold them in their place in the stack. Each liner further has a thumb notch to assist the caretaker in removing the soiled liner for disposal. Another device is the Jordan "Combined Pet Food Bowl and Disposable Liner," U.S. Pat. No. D330,785. The Jordan device is a cylindrical bowl having a similarly-shaped liner; the liner has a protruding tab that presumably aids in the removal of the liner from the bowl. Another device is the Budd "Disposable Pet Food Dish," U.S. Pat. No. 4,800,845. It is a bowl having a pair of rectangular bowls formed within it; each bowl has one or more dimples or "raised portions" in their walls to hold the liners in the bowls while in use to provide food and water to the pet. Koch, U.S. Pat. No. 4,428,325 is a "Feeding Bowl and Liner Therefor," is a bowl/liner combination with horizontal and vertical recesses to retain the liner within the bowl and to aid the caregiver in pulling the liners out of the bowl. The Boehlert "Disposable Feeding Dish and Its Complementary Receptacle," U.S. Pat. No. 3,698,594 is a cylindrical bowl having a liner, where the liner is adhered to the bowl with a temporary adhesive to prevent its pulling out while the pet is feeding. Brown "Disposable Insert Containing Pet Dish Apparatus", U.S. Pat. No. 6,644,241 does disclose a dish and liner combination for pet feeding, however, it fails to disclose a retainer structure for holding the stack of liners from popping out. Rinally, the Bates "Dish or Plate," U.S. Pat. No. 730,082 is simply a plate having disposable liners; there is no aesthetic value to the Bates device, and it will not work with standard disposable liners.

None of the numerous aforementioned attempts at solving the soiled food dish problem has truly provided a desirable solution. Notably lacking is a bowl/liner combination that has any aesthetic attractiveness. Furthermore, the only prior devices that included the capacity to hold a stack of liners required adhesive between each liner; making these approaches undesirable from the perspective of manufacturing, storage and shipping. Furthermore, to prevent spinning (a common problem with the basic bowl-and-liner design), these prior devices either require adhesive, or if they do have some other approach, this other approach is limited to a non-stacked liner arrangement and/or it is very difficult to overcome the anti-spin element so that the liner can be removed.

As discussed above, the instant disclosure is a continuation-in-part of application Ser. No. 11/150,704 ('704). The invention of the '704 application sought to solve the aforementioned problems by providing a combination decorative pet dish that was configured to accept disposable liners within it. That device solved all of these prior art problems very well. Once issue that it did not adequately address, however, is the substantial cost involved to provide the custom-shaped liners described in that disclosure. This is the primary objective of the present invention, namely, to provide a pet dish and liner combination that is aesthetically pleasing, accepts readily-available liners, while also including anti-spin features, and further permitting a stack of liners to be held within the bowl without the need for supplemental adhesive or some sort of tool to remove the liners from the bowl.

SUMMARY OF THE INVENTION

In light of the aforementioned problems associated with the prior devices, it is an object of the present invention to provide a Pet Dish and Disposable Liner. The dish should be durable and washable, but the liner should be disposable, in a form that is conventionally available from a number of pre-existing supply sources. The dish should be aesthetically pleasing. The dish and liners should cooperate so that the liner inserted into the dish will not inadvertently be forced out by the eating pet, nor should the liner be allowed to spin within the dish. The dish and liners should also be configured so that a stack of liners can be held conveniently within a single dish. The dish would be particularly attractive if it resembled the face of a pet, such as a cat or dog.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 8A-8C are cutaway side views and a front view of the clip element of the dish of FIG. 1.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Pet Dish and Disposable Liner.

Figure 1:
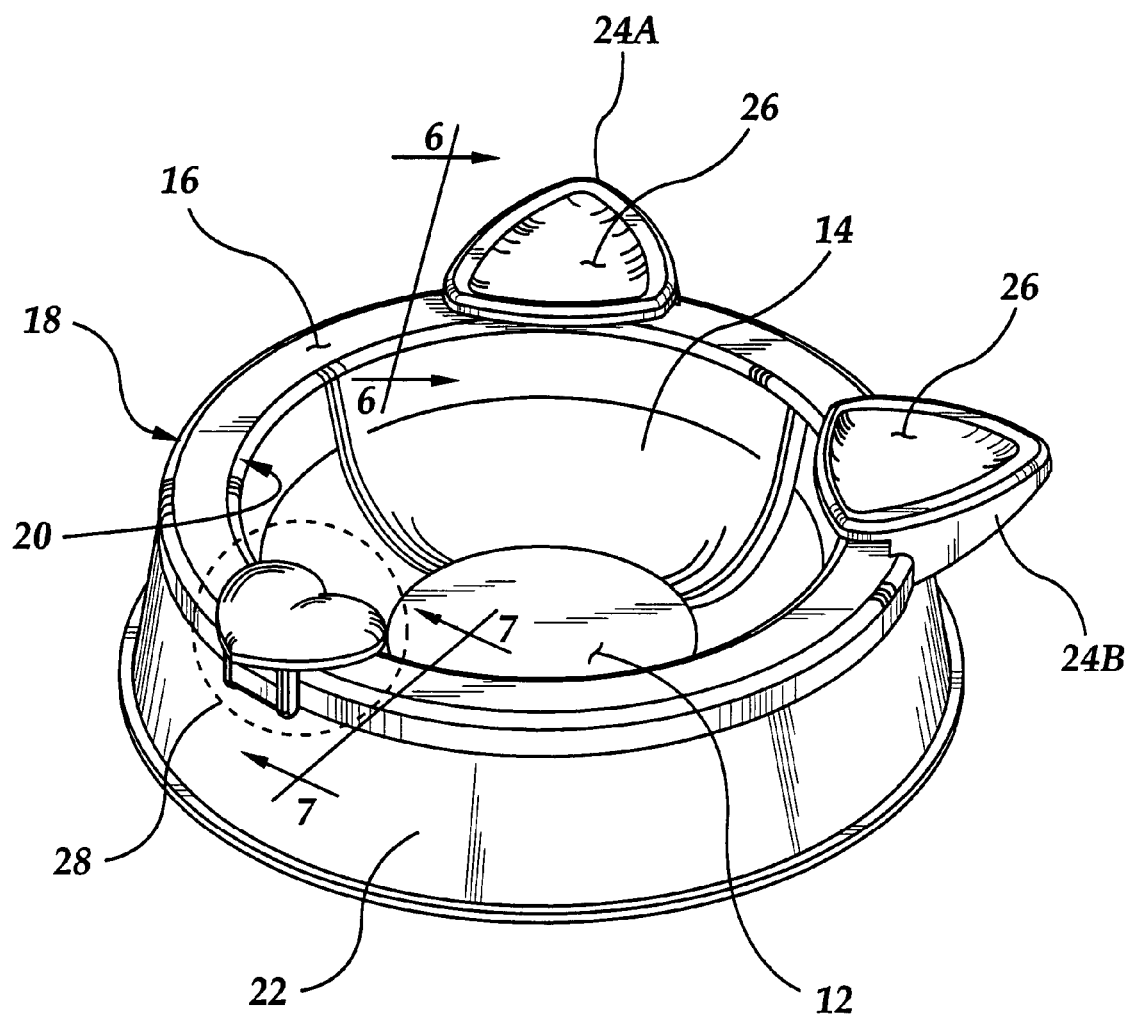
FIG. 1 is a perspective view of a preferred embodiment of the pet dish of the present invention.

The present invention can best be understood by initial consideration of FIG. 1. FIG. 1 is a perspective view of a preferred embodiment of the pet dish 10 of the present invention. As discussed above, the dish 10 of the present invention has many of the general attributes of the invention that is the subject of the '704 application, with the added benefit of being design to accept conventional (usually circular) disposable liners.

The dish 10 defines a substantially hemispherical recessed portion 12 that is bounded by the interior wall 14. The interior wall 14 extends up the sides of the recessed portion until it reaches the top wall 16. The top wall 16 is a generally flat, peripheral "shelf" that surrounds the recessed portion 12. The transition between the interior wall 14 and the top wall 16 is defined as the inner edge 20.

The outer form of the dish 10 is defined by a side wall 22. The side wall 22 may have a lower ridge (not numbered) where it reaches the bottom of the dish 10. The ridge is provided to accept a non-skid ring or bottom cover thereon. The ring or cover (not shown) assists in preventing the pet from pushing the dish 10 around the floor during meals. The ring or cover is preferably a soft, pliable plastic or rubber material that could be snapped on or off of the bottom of the dish 10, such as for cleaning or replacement.

At its upper bound, the side wall 22 transitions to an outer edge 18, which then leads to the top wall 16.

The dish 10 has one, two or more liner retaining elements 24A, 24B, much like the device of the '704 application. The first and second liner retaining elements 24A, 24B may be shaped to simulate the ears of a pet (somewhat triangularly-shaped, and defined by the recessed portions 26). One unique aspect here, however, is a movable liner retaining element 28. The movable liner retaining element 28 acts as a clasp for the liners that are inserted into the recessed portion 12. As its name suggests, the movable liner retaining element 28 is designed to pivot up and away from the depicted first (or down) position. When in the second (or up) position, the movable liner retaining element 28 is out of the way for installation or removal of the disposable liners. When the movable liner retaining element 28 is in the first position, it will clamp the liners in place, which (along with the first and second liner retaining elements 24A, 24B) will prevent the liners from popping out of the dish 10, and further will assist in the prevention of the liners spinning do to forces created by the eating pets' tongue. We will now turn to FIG. 2 to briefly review the available liner design that will work with the dish 10.

Figure 2:
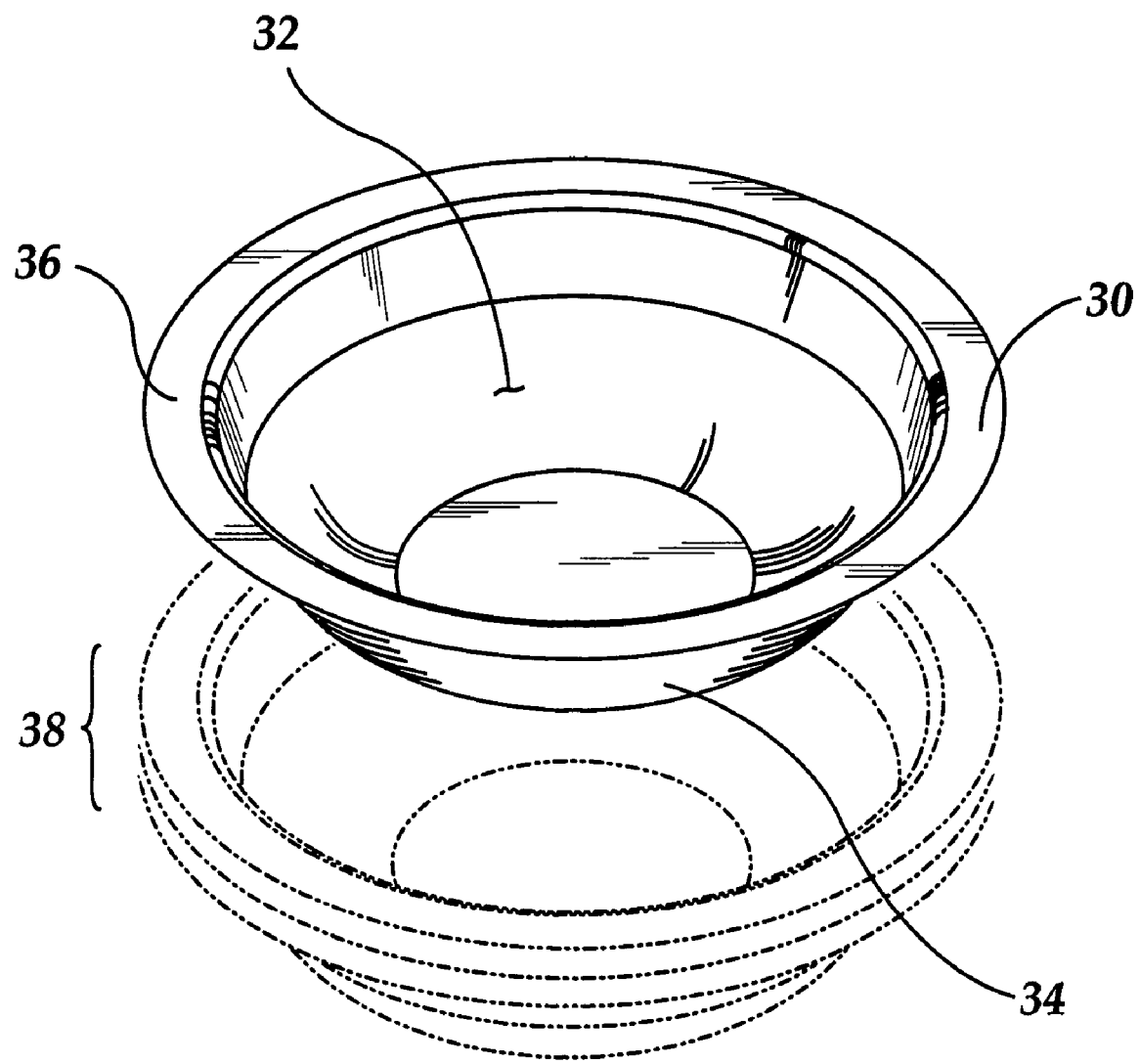
FIG. 2 is a perspective view of a conventional bowl liner suitable for use with the dish of FIG. 1.

FIG. 2 is a perspective view of a conventional bowl liner 30 suitable for use with the dish of FIG. 1. The liner 30 has a food receptacle 32 formed by the top surface of the bowl portion 34 of the liner 30. The periphery of the upper rim of the food receptacle 32 is an outer rim portion 36. These liners 30 are available in a wide variety of sizes and shapes from several different manufacturing sources. They are design to "nest" together in a liner stack 38, as shown. This nesting capability not only allows for the compact storage of the liners 30, but also cooperates with the design of the dish of the present invention to provide the easy removal of soiled liners 30, and their replacement with clean ones. The specific interaction between these elements is more clearly depicted in FIG. 3.

Figure 3:
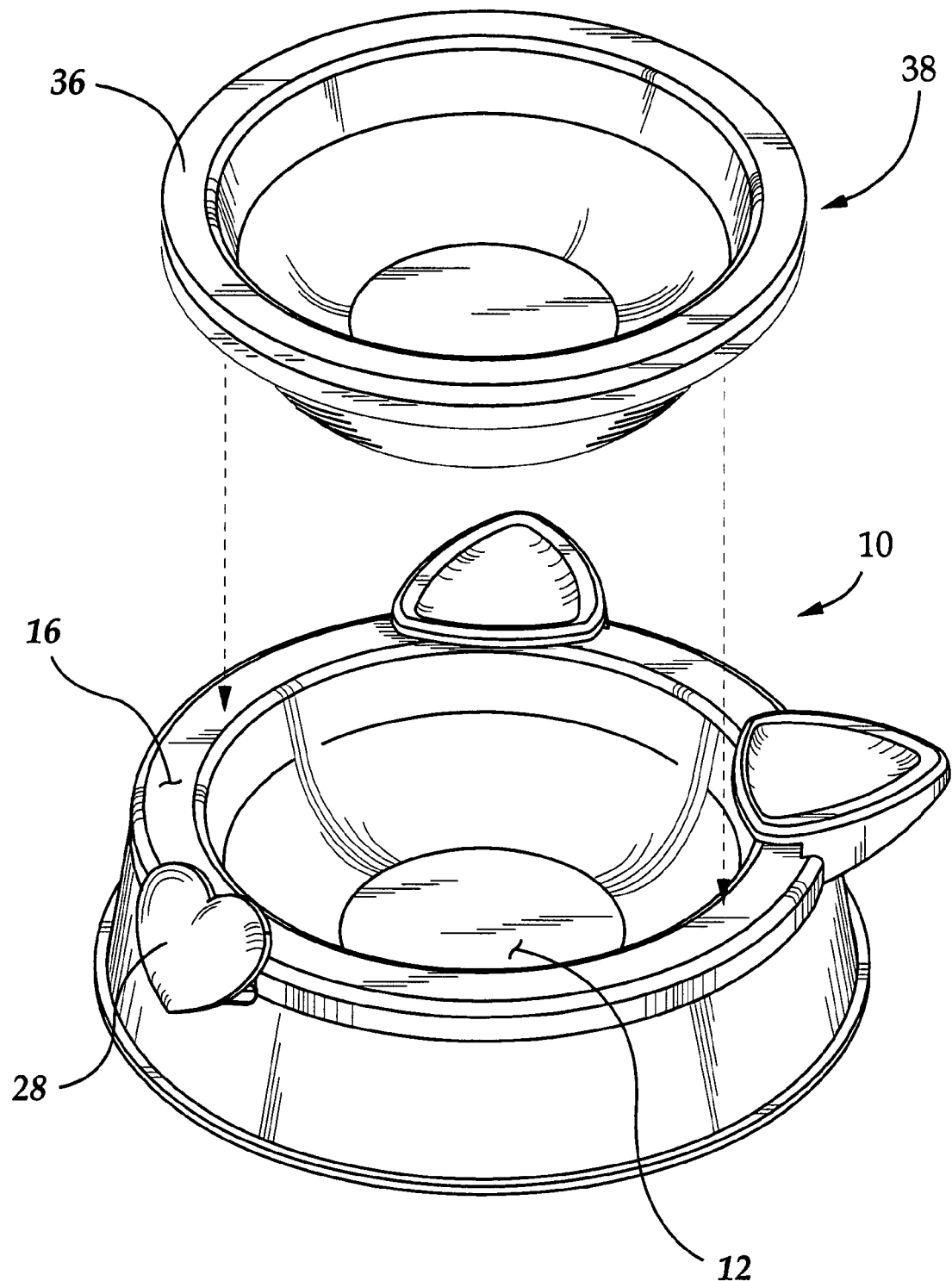
FIG. 3 is an exploded perspective view of the dish of FIG. 1 and a stack of the liners of FIG. 2.
Figure 4A:
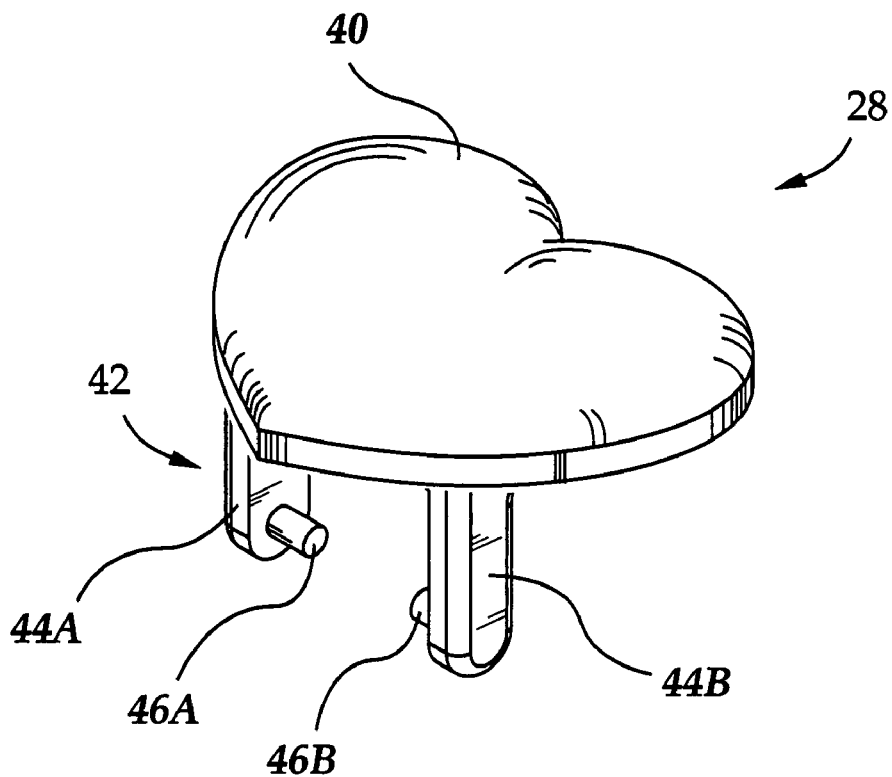
FIGS. 4A and 4B are perspective and side views, respectively, of the movable liner retaining element of the dish of FIG. 1.
Figure 4B:
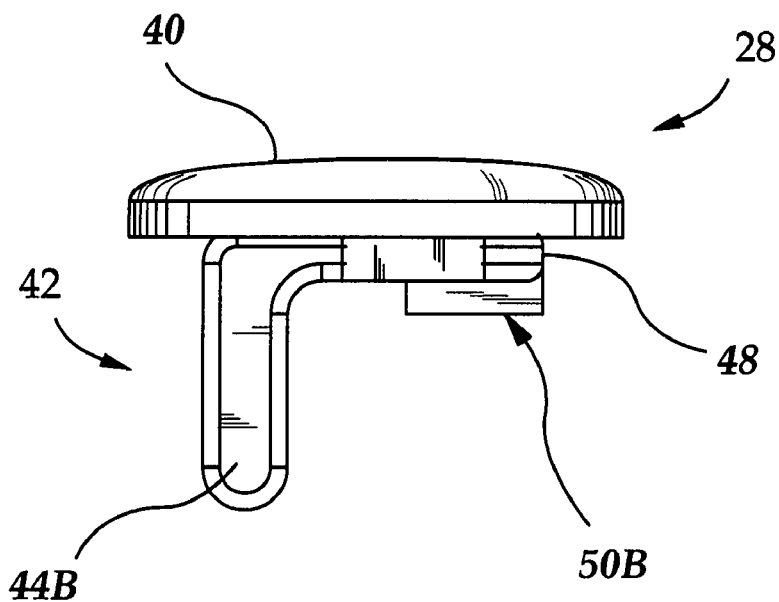

FIG. 3 is an exploded perspective view of the dish of FIG. 1 and a stack of the liners of FIG. 2. The dish 10 is shaped so that the outer rim portion 36 of the liners in the stack 38 will fit atop the top wall 16, while the bowl portion (see FIG. 2) of the liners in the stack 38 will fit into the recessed portion 12. The outer rim portion 36 of the stack of liners will fit under the overhanging lip of the liner retaining elements (see FIG. 1 for specifics). To install or remove one or more liners, the movable liner retaining element 28 is simply flipped up into the second position depicted here so that the bottom side of the outer rim portions 36 of the liners in the stack 38 will be released. FIGS. 4A and 4B depict the structural specifics of the movable liner retaining element.

FIGS. 4A and 4B are perspective and side views, respectively, of the movable liner retaining element 28 of the dish of FIG. 1. The element 28 comprises two major structures, the clip element 42 and the cover element 40. The depicted embodiment of the cover element 40 is a decorative simulation of a tongue or a heart-shape; other shapes and styles may be desired, which is why the cover element 40 preferably detachably attaches to the clip element 42.

The clip element 42 is defined by a cantilevered section 48 which extends generally at a right angle to a first and second pivot legs 44A, 44B. The pivot legs 44A, 44B terminate adjacent to their distal ends in a opposing, inwardly-turned first and second pivot pins 46A and 46B. The movable liner retaining element 28 pivots (between a first and second position) around the pivot pins 46A, 46B.

The cantilevered section 48 has a second prong 50B extending downwardly from its bottom surface. The prong 50B (which may actually be two or more downwardly-extending protrusions) serves to clamp the outer rim portion(s) of the liner(s) firmly to the top wall of the dish, in order to stabilize the liner(s) and resist spinning or other movement. Now turning to FIG. 5, we can continue to explore the features of this novel and nonobvious invention.

Figure 5:
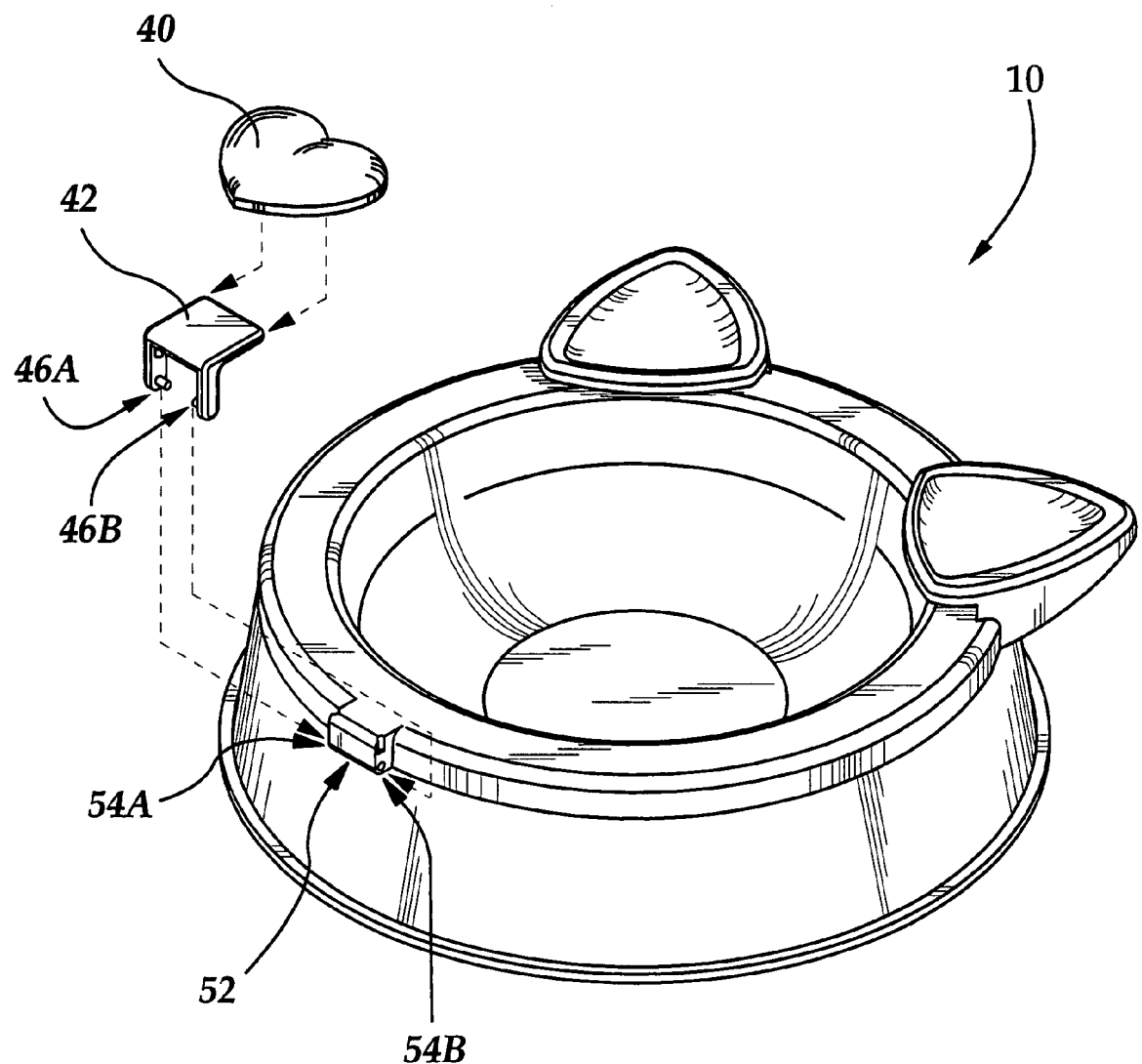
FIG. 5 is a partially exploded perspective view of the pet dish of FIG. 1.

FIG. 5 is a partially exploded perspective view of the pet dish 10 of FIG. 1. In this figure, the functionality of the movable liner retaining element is clearly depicted. The pivot pins 46A, 46B of the liner retaining element cooperate with first and second bores 54A and 54B formed in a hinge block 52. The hinge block 52 is formed in the upper portion of the outer wall of the dish 10.

As also shown here, the cover element 40 slides or otherwise attaches to the top of the clip element 42 so that, when assembled, it will appear as shown in FIGS. 1 and 3. Finally, we will turn to FIGS. 6 and 7 to examiner additional specifics related to the structure of the two types of liner retaining elements.

Figure 6:
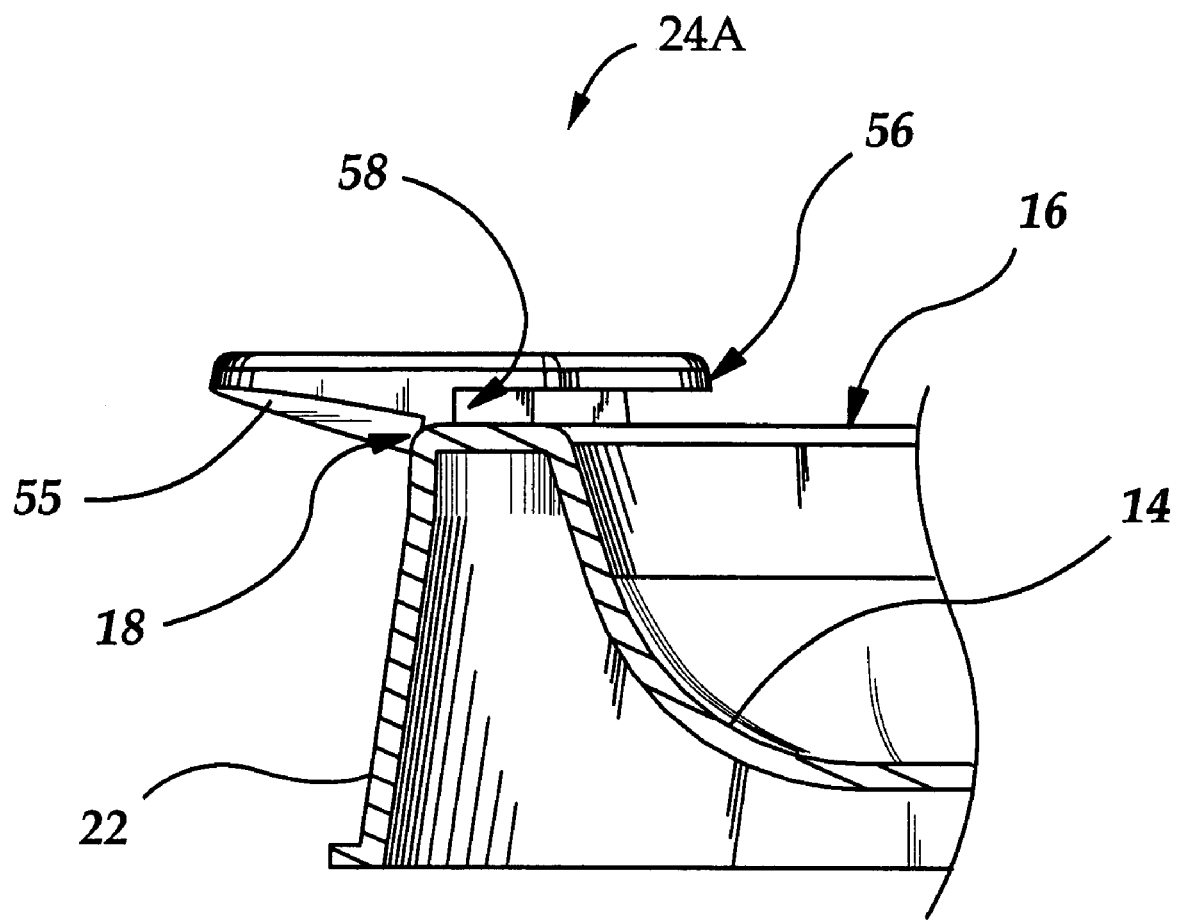
FIG. 6 is a partial cutaway side view of the dish of FIG. 1.

FIG. 6 is a partial cutaway side view of the dish of FIG. 1 depicting the first liner retaining element 24A (which is essentially identical to the second liner retaining element). The liner retaining element 24A comprises a body 55 extending upwardly and radially outward from the top wall 16 of the dish. As depicted, the body 55 may extend past the outer edge 18 and partially down the side wall 22 of the dish in order to provide additional strength and durability to the structure. The body 55 extends upward to terminate in a retaining lip 56, which cantilevers over the top of the top wall 16. The inner (radially-speaking) surface of the body 55, referred to here as the retaining wall 58, serves to center and stabilize the outer rim portions of the liner(s) when they are resting in the recessed portion of the dish. As shown here, there is enough vertical spacing between the bottom surface of the retaining lip 56 and the top surface of the top wall 16 to allow enough room for a stack of liners to fit therebetween.

Figure 7:
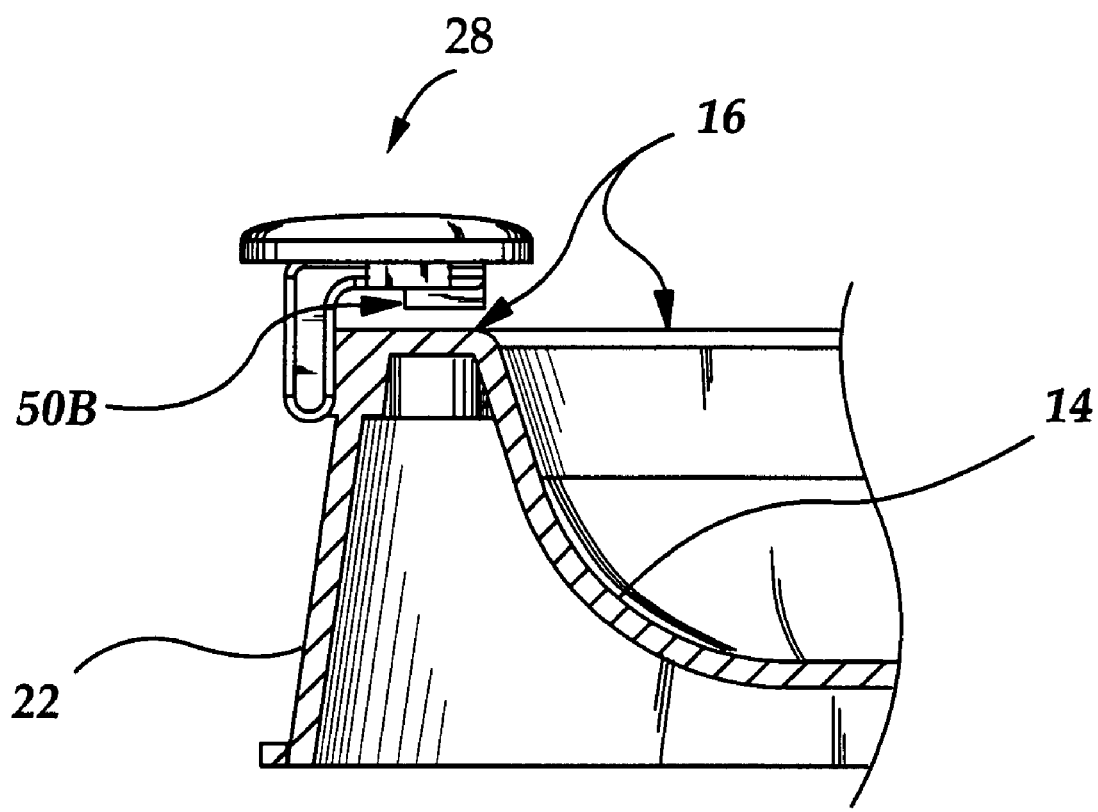
FIG. 7 is another partial cutaway side view of the dish of FIG. 1.

The movable liner retaining element 28 depicted in FIG. 7 is in the "first position," as also shown in FIG. 1. In this position, the prong 50 is juxtaposed atop the top wall 16. As should be appreciated, when in this position, a stack of liners would be clamped between the prong 50 and the top wall 16. A functional feature of the present invention remains to be discussed; as shown in FIGS. 8A-8C.

FIG. 8A is a cutaway side view of the clip element 48 of the dish of the present invention. This view provides additional detail regarding the mechanism by which the movable retaining element remains "locked down" atop the stack of liners inserted into the recessed portion of the dish. As shown in this FIG. 8A, the inside-facing surface of the first pivot leg 44A (i.e. the side facing the other pivot leg) has a first tab 60A protruding inwardly therefrom. FIG. 8B depicts a front view of the clip element 48 so that the first tab 60A on the first pivot leg 44A, and the second tab 60B on the second pivot leg 44B can be clearly seen. It is noted that both of the two prongs 50A and 50B can also be seen in this front/end view of the clip element 48.

Figure 8C:
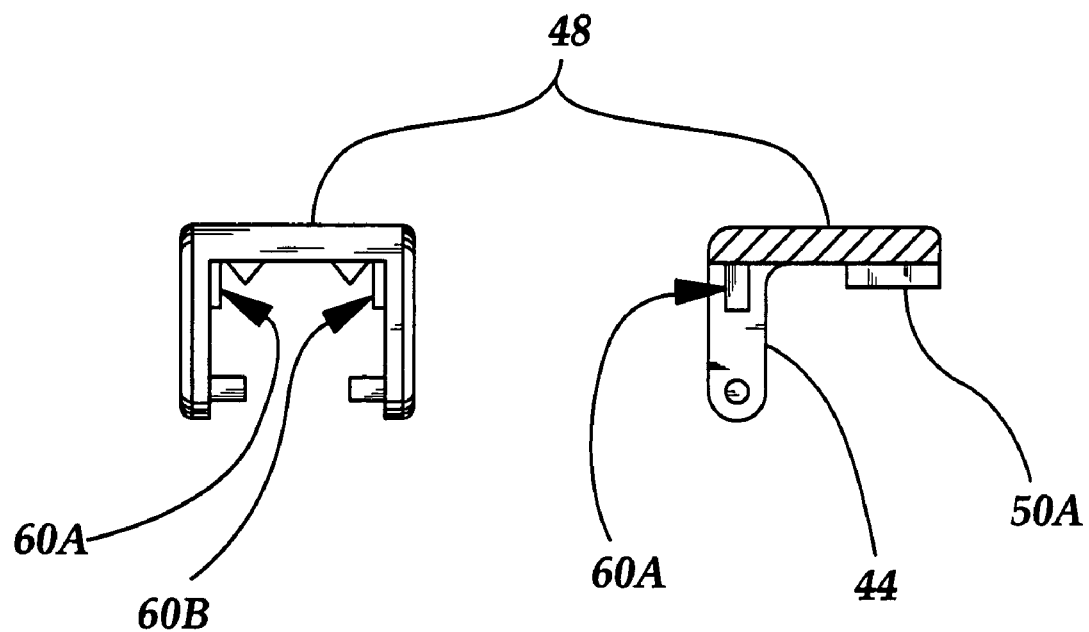
Figure 8C:
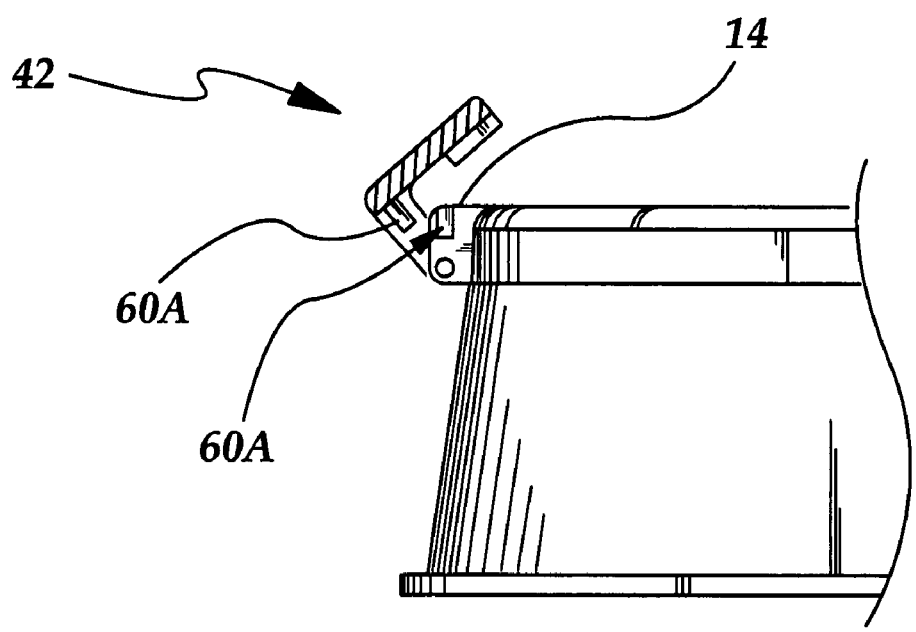

As shown in FIG. 8C, the hinge block 52 has a pair of notches (the second notch 62B shown here) on opposing sides of the block 52. These notches (e.g. 62B) are positioned and sized to cooperate with the aforementioned tabs 60A, 60B, such that when the movable liner retaining element (see FIG. 1) is placed in its "down" position (i.e. rotated clockwise in this FIG. 8C), the tabs 60A, 60B will engage their respective notches (e.g. 62B), and the clip element 48 (and the entire movable liner retaining element) will be held in that down position. As mentioned above, when in the "down" position, the clip element 48 exerts clamping pressure atop the outer rim portion (see FIG. 2) of the liner stack, so that the liner(s) do not pop up and out of the recessed portion of the dish.

Since the liner retaining elements (24A, 24B—see FIG. 1) do not hold down the liner(s) when they are resident within the recessed portion of the dish, the movable liner retaining element (28—see FIG. 1) is the mechanism that clamps or releases the stack. To add or remove liner(s), simply flip up the movable liner retaining element and liners can easily be slipped in or out from under the liner retaining elements (24A, 24B—see FIG. 1). It is preferred that the tabs 60A, 60B be constructed from a somewhat pliant material so that they might be engaged and disengaged from the notches 62A, 62B without undue force being necessary.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A dish and liner therefor, the combination comprising:
  a dish comprising a center recessed portion defined by an upper periphery defined by a circumferential top wall, said upper periphery defined by at least one immovable liner retaining element and a least one movable liner retaining element positioned atop said top wall; and
  a liner comprising a receptacle configured cooperate with the contour of said center recessed portion, said receptacle defined by an outer rim portion, said outer rim portion configured to rest atop said top wall portion while said receptacle is inserted into said center recessed portion.

2. The combination of claim 1, wherein each said immovable liner retaining element comprises a body extending upwardly from said upper periphery to form a retaining lip extending inwardly in partial juxtaposition in spaced relation above said top wall.

3. The combination of claim 2, wherein said dish is further defined by:
  an interior wall forming said center recessed portion;
  an inner edge separating said interior wall from said top wall; and
  a side wall and an outer edge separating said side wall from said top wall.

4. The combination of claim 3, wherein each said body extends upwardly from said side wall adjacent to said outer edge, said body forming a retaining wall extending upwardly from said top wall, said retaining wall terminating in a generally horizontal section extending inwardly in spaced relation to said top wall and terminating to form said retaining lip.

5. The combination of claim 4, further comprising a hinge block extending from said dish, said movable liner retaining element hingably attached to said hinge block.

6. The combination of claim 5, wherein said movable liner retaining element comprises a clip element having a cantilevered section extending from at least one pivot leg having a distal end, said clip element hingably attaching to said hinge block at said pivot leg.

7. The combination of claim 6, wherein said movable liner retaining element comprises a pair of said pivot legs in spaced relation, each said pivot leg further comprising a pivot pin extending from said respective pivot leg.

8. The combination of claim 7, wherein said hinge block further comprises first and second bores formed therein, said bores cooperatively formed to accept said pivot pins therein.

9. The combination of claim 8, wherein said clip element cantilevered section defines a top surface and a bottom surface, said bottom surface having a prong extending downwardly therefrom.

10. The combination of claim 9, wherein said movable liner retaining element further comprises a cover element adapted to attach atop said top surface of said cantilevered section.

11. The combination of claim 10, wherein said movable liner retaining element defines a first position and a second position, said first position defined by said cantilevered section juxtaposed in spaced relation above said top wall.

12. The combination of claim 11, wherein said movable liner retaining element second position is defined by said clip element rotated about said pivot pins until said cantilevered section is no longer juxtaposed above said top wall.

13. A pet dish, comprising:
  a center recessed portion defined by an upper periphery having by a circumferential top surface;
  at least one immovable liner retaining element fixedly disposed on said upper periphery, said immovable liner retaining element having an inwardly-extending retaining lip in spaced relation above said top surface; and
  at least one movable liner retaining element comprising a cantilevered section, said element pivotally attached to said dish whereby said element defines a first position whereat said cantilevered section is in spaced relation above said top surface.

14. The dish of claim 13, further comprising a hinge block extending from said dish, said movable liner retaining element hingably attached to said hinge block.

15. The dish of claim 14, wherein said movable liner retaining element comprises a clip element having said cantilevered section extending from a pair of pivot legs, each said leg having a distal end and further defined by a pivot pin protruding therefrom adjacent thereto, said clip element hingably attaching to said hinge block at said pivot legs.

16. The dish of claim 15, wherein said hinge block further comprises first and second bores formed therein, said bores cooperatively formed to accept said pivot pins therein, said hinge block further having at least one notch formed in its side.

17. The dish of claim 16, wherein:
  said clip element cantilevered section defines a top surface and a bottom surface, said bottom surface having a prong extending downwardly therefrom, said clip element configured so that said prong extends between said clip element and said top surface when said moveable liner retaining element is in said first position; and said clip element further comprising a tab extending inwardly from one said pivot leg, said tab and said notch cooperatively aligned such that they engage when said clip element is in said first position.

18. The dish of claim 17, wherein said movable liner retaining element further comprises a cover element adapted to detachably attached to said clip element.

19. The dish of claim 18, wherein said movable liner retaining element further defines a second position, said second position is defined by said clip element rotated about said pivot pins until said cantilevered section is no longer juxtaposed above said top surface.

20. The dish of claim 19, wherein each said immovable liner retaining element comprises a body extending upwardly from said upper periphery to form an upwardly-reaching retaining wall transitioning into a retaining lip extending inwardly in partial juxtaposition and in spaced relation above said top surface.

* * * * *